US009478257B2

(12) United States Patent
Saitou et al.

(10) Patent No.: US 9,478,257 B2
(45) Date of Patent: Oct. 25, 2016

(54) INFORMATION PROCESSING DEVICE, INFORMATION PROCESSING METHOD, AND INFORMATION PROCESSING PROGRAM

(71) Applicant: Sony Corporation, Tokyo (JP)

(72) Inventors: Yuji Saitou, Tokyo (JP); Ayako Iwase, Kanagawa (JP); Nobuki Furue, Tokyo (JP); Shinichi Iriya, Kanagawa (JP); Hiroyuki Ozawa, Tokyo (JP)

(73) Assignee: Sony Corporation, Tokyo (JP)

( * ) Notice: Subject to any disclaimer, the term of this patent is extended or adjusted under 35 U.S.C. 154(b) by 7 days.

(21) Appl. No.: 14/138,413

(22) Filed: Dec. 23, 2013

(65) Prior Publication Data

US 2014/0112640 A1 Apr. 24, 2014

Related U.S. Application Data

(63) Continuation of application No. 12/793,239, filed on Jun. 3, 2010, now Pat. No. 8,649,663.

(30) Foreign Application Priority Data

Jun. 10, 2009 (JP) ................................ 2009-139447

(51) Int. Cl.
| | |
|---|---|
| *G11B 27/00* | (2006.01) |
| *H04N 5/93* | (2006.01) |
| *H04N 9/80* | (2006.01) |
| *G11B 27/10* | (2006.01) |
| *G11B 27/34* | (2006.01) |
| *H04N 5/76* | (2006.01) |
| *H04N 5/80* | (2006.01) |

(52) U.S. Cl.
CPC ............. *G11B 27/10* (2013.01); *G11B 27/105* (2013.01); *G11B 27/34* (2013.01); *H04N 5/76* (2013.01)

(58) Field of Classification Search
USPC ................ 386/278, 326, 286, 239, 248, 332
See application file for complete search history.

(56) References Cited

U.S. PATENT DOCUMENTS

| | | | |
|---|---|---|---|
| 6,449,422 B1 | 9/2002 | Ebisawa | |
| 7,480,445 B2 * | 1/2009 | Yamamoto et al. | .......... 386/249 |
| 7,796,857 B2 | 9/2010 | Hiroi et al. | |
| 8,009,962 B1 * | 8/2011 | Herz | ............................ 386/248 |
| 8,649,663 B2 | 2/2014 | Saitou et al. | |
| 2006/0147184 A1 | 7/2006 | Hiroi et al. | |

(Continued)

FOREIGN PATENT DOCUMENTS

| | | |
|---|---|---|
| JP | 03-090968 A | 4/1991 |
| JP | 06-165009 A | 6/1994 |

(Continued)

OTHER PUBLICATIONS

Japanese Office Action issued on Aug. 11, 2015 in patent application No. 2013118842.

(Continued)

*Primary Examiner* — Daquan Zhao
(74) *Attorney, Agent, or Firm* — Chip Law Group

(57) ABSTRACT

An information processing device includes a control unit configured to store in a recording medium a piece of attribute information specified by a user input from among a plurality of sequential pieces of the attribute information in association with a predetermined time period of a content stored in the recording medium.

16 Claims, 11 Drawing Sheets

(56) References Cited

U.S. PATENT DOCUMENTS

| | | | |
|---|---|---|---|
| 2008/0165141 A1* | 7/2008 | Christie | 345/173 |
| 2009/0187121 A1 | 7/2009 | Evans | |
| 2010/0042618 A1* | 2/2010 | Rinearson et al. | 707/5 |
| 2010/0115408 A1* | 5/2010 | Mujkic et al. | 715/716 |
| 2010/0316357 A1 | 12/2010 | Saitou et al. | |

FOREIGN PATENT DOCUMENTS

| | | |
|---|---|---|
| JP | 08-255171 A | 10/1996 |
| JP | 11-112254 A | 4/1999 |
| JP | 2000-090121 A | 3/2000 |
| JP | 2000-295574 A | 10/2000 |
| JP | 2001-134586 A | 5/2001 |
| JP | 2004-007042 A | 1/2004 |
| JP | 2005-056361 A | 3/2005 |
| JP | 2006-139829 A | 6/2006 |
| JP | 2007-036538 A | 2/2007 |
| JP | 2007-116566 A | 5/2007 |
| JP | 2007-142785 A | 6/2007 |
| JP | 2007-226606 A | 9/2007 |
| JP | 2007-228334 A | 9/2007 |
| JP | 2007-282268 A | 10/2007 |
| JP | 2008-098719 A | 4/2008 |
| JP | 2008-164793 A | 7/2008 |
| JP | 2008-532428 A | 8/2008 |
| JP | 2009-017598 A | 1/2009 |
| JP | 2009-521753 A | 6/2009 |
| WO | WO 2010/071187 A1 | 6/2010 |

OTHER PUBLICATIONS

Office Action Received for Japanese Patent Application No. 2013-118842 Mailed on Jan. 6, 2016, pp. 2 of Office Action.

* cited by examiner

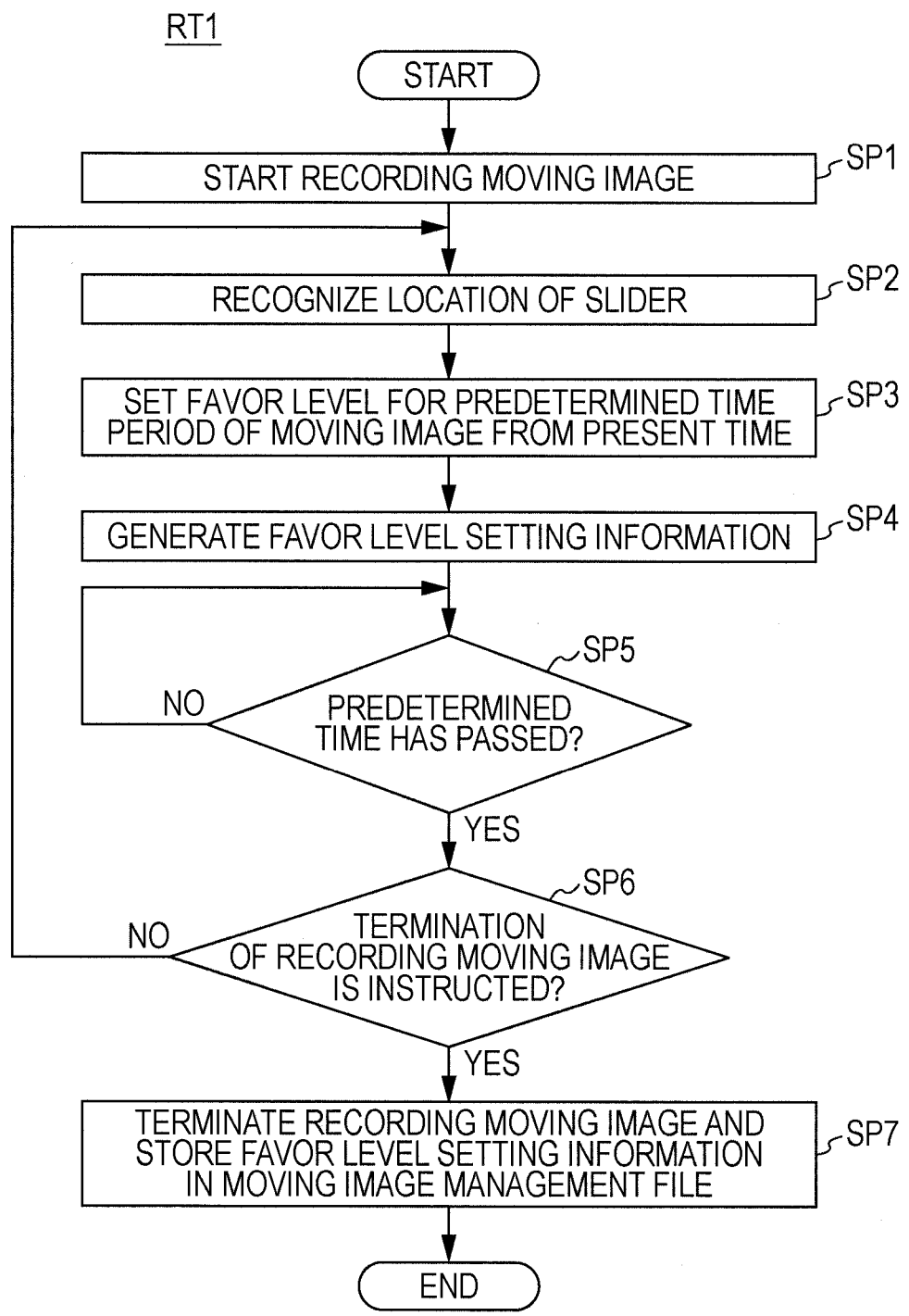

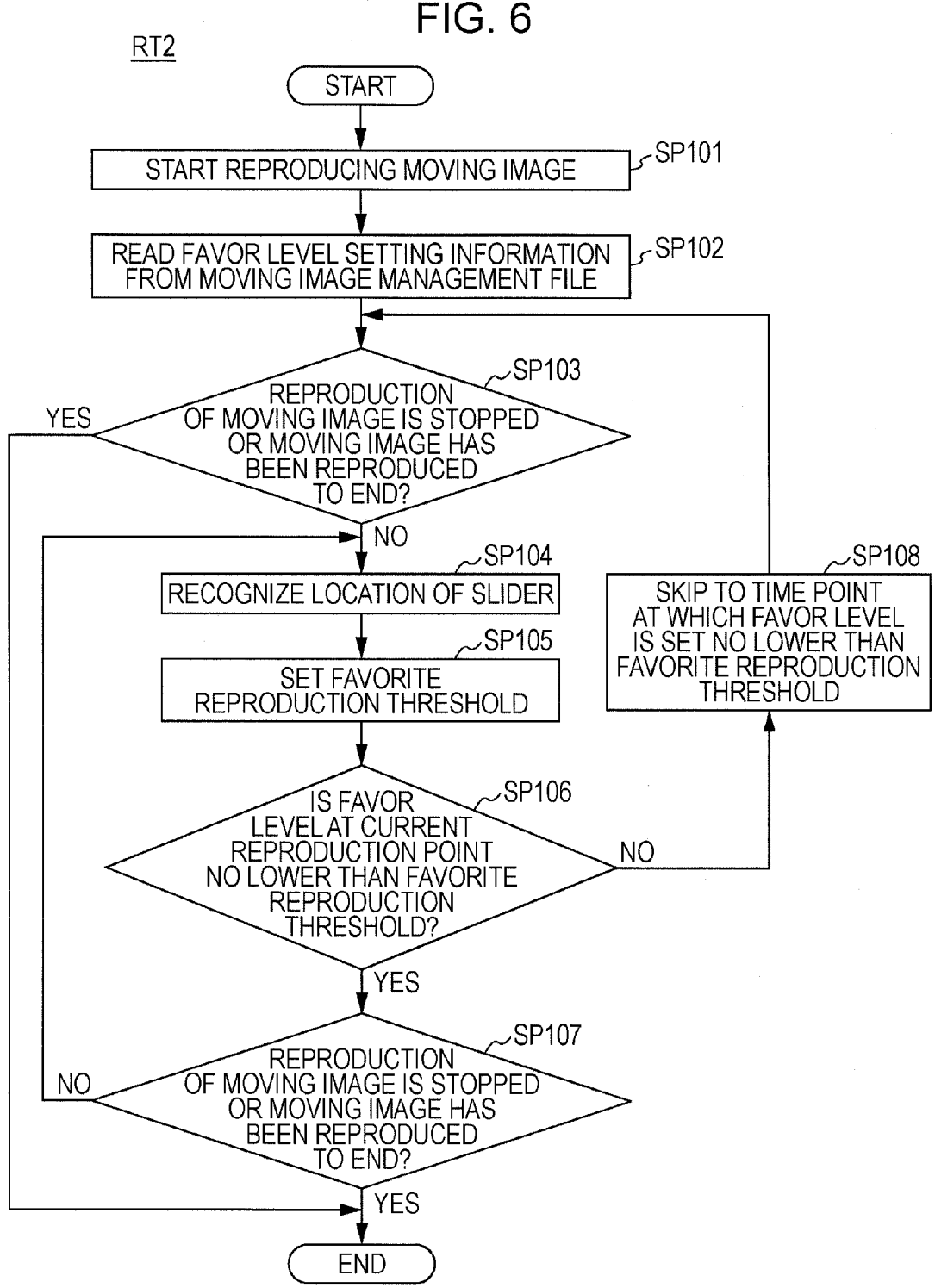

INFORMATION PROCESSING DEVICE, INFORMATION PROCESSING METHOD, AND INFORMATION PROCESSING PROGRAM

RELATED APPLICATIONS

This application is a continuation of U.S. patent application Ser. No. 12/793,239, entitled "INFORMATION PROCESSING DEVICE, INFORMATION PROCESSING METHOD, AND INFORMATION PROCESSING PROGRAM," filed Jun. 3, 2010, which claims priority to Japanese Patent Application No. 2009-139447, filed Jun. 10, 2009. Each of the documents listed above is incorporated herein by reference in its entirety.

BACKGROUND OF THE INVENTION

1. Field of the Invention

The present invention relates to an information processing device, an information processing method, and an information processing program that are suitable for recording a content, for example.

2. Description of the Related Art

There have been proposed recording/reproducing devices, such as a digital video camera and a hard disk recorder, that detect an exciting scene based on information including a sound level of a moving image and record the scene detected (see, for example, Japanese Unexamined Patent Application Publication No. 2007-116566).

There have also been proposed such recording/reproducing devices that record a favorite point specified by a user at the time of recording the moving image in association with the moving image.

SUMMARY OF THE INVENTION

There may be a case in which the user wants to check various parts of the moving image when it is reproduced, for example, to check only important parts, or to check parts where a certain person appears.

However, such a device as described above can make its reproduction unit reproduce only a few seconds before and after the exciting scene or the favorite point, and may not be able to reproduce moving images satisfying various requests of the user.

Therefore, it is desirable to provide an information processing device, an information processing method, and an information processing program capable of reproducing contents satisfying various requests of the user.

According to an embodiment of the present invention, there is provided a control unit that stores in a recording medium a piece of attribute information specified by a user input from among a plurality of sequential pieces of the attribute information in association with a predetermined time period of content stored in the recording medium.

By associating the attribute information specified with respect to each predetermined time period of the content as described above, at the time of reproduction, a part with which an arbitrary piece of the attribute information is associated can be extracted from the content and reproduced by a reproduction unit.

Furthermore, by letting a plurality of pieces of the attribute information have sequentiality, at the time of the reproduction, not only the part of the content with which the arbitrary piece of the attribute information is associated but also a part of the content with which an arbitrary range of the attribute information is associated can be extracted and reproduced by the reproduction unit.

In this manner, a desired part can be extracted from the content and reproduced only by letting the user specify the desired piece or range of the attribute information, and the extracted part of the content can be changed to another desired part of the content to be reproduced only by changing the specification.

Therefore, according to an embodiment of the present invention, an information processing device, information processing method, and information processing program capable of reproducing contents satisfying various requests of the user can be achieved.

BRIEF DESCRIPTION OF THE DRAWINGS

FIG. 4 is a flowchart showing a favor level setting procedure according to the embodiment;

FIG. 6 is a flowchart showing a favorite reproduction procedure according to the embodiment;

FIGS. 8A and 82 are schematic diagrams for explaining a reproduction based on the person attribute according to the embodiment;

DESCRIPTION OF THE PREFERRED EMBODIMENTS

Best modes (referred to below as embodiments) for carrying out the present invention will be explained below in the following order.

1. Embodiment (an example of setting a favor level)
2. Another embodiment (an example of setting a person attribute)
3. Modifications

1. Embodiment

1-1. Outline of an Embodiment

First, an outline of an embodiment is explained. After the outline is explained, a specific example of the embodiment will be explained.

Figure 1:
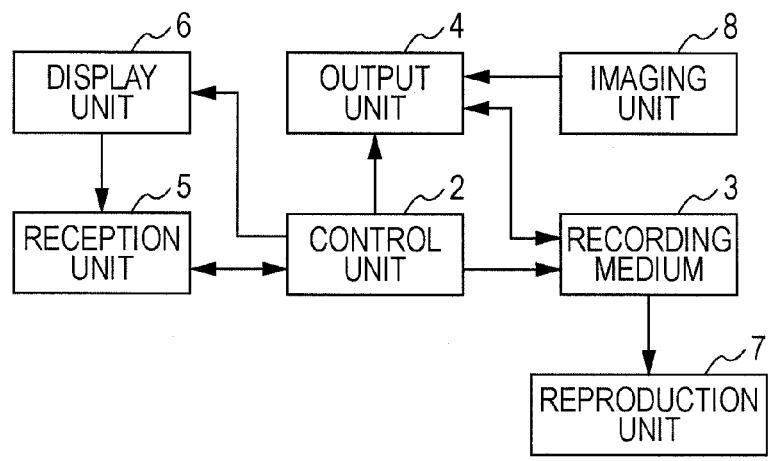
FIG. 1 is a block diagram showing the functional configuration of an information processing device that outlines embodiments of the present invention.

FIG. 1 shows the functional configuration of an information processing device 1 that outlines the embodiment. The information processing device 1 includes a control unit 2. The control unit 2 is configured to store in a recording medium 3 a piece of attribute information specified by a user input among a plurality of sequential pieces of the attribute information in association with a predetermined time period of a content stored in the recording medium 3.

By the configuration described above, the information processing device 1 can extract a part of the content associated with an arbitrary piece of the attribute information to be reproduced by a reproduction unit. By letting a plurality of pieces of the attribute information have sequentially, at the time of reproduction, the information processing device 1 can extract not only the part of the content with which the arbitrary piece of the attribute information is associated but also a part of the content with which an arbitrary range of the attribute information is associated and make the reproduction unit reproduce the extracted part of the content.

In this manner, at the time of reproduction, the information processing device 1 can extract a desired part from the content and reproduce it only by letting the user specify the desired piece or range of the attribute information, and the information processing device 1 can extract and reproduce another desired part of the content instead only by changing the specification. Thus, the information processing device 1 can make the reproduction unit reproduce the contents satisfying various requests of the user.

The information processing device 1 basically configured as described above may also include the following configurations.

The information processing device 1 may include an output unit 4 that outputs the content stored in the recording medium 3 and a reception unit 5 that receives the user input. In this case, the control unit 2 may be configured to store in the recording medium 3 a piece of attribute information specified by the user input received by the reception unit 5 in association with a predetermined time period of the content while letting the output unit 4 output the content.

Furthermore, the information processing device 1 may be configured so that the reception unit 5 receives a touch operation performed on the display surface of a display unit 6 as the user input. The control unit 2 may be configured to store in the recording medium 3 a piece of attribute information specified by the touch operation in association with a predetermined time period of the content.

Moreover, the information processing device 1 may include a reproduction unit 7 that reproduces only the part of the content associated with the attribute information specified by the user input based on the attribute information associated with the predetermined time period of the content.

Furthermore, the information processing device 1 may include an imaging unit 8, and the output unit 4 may be configured to output a moving image taken by the imaging unit 8 as the content.

A specific example of the information processing device 1 configured as described above is explained below in detail.

1-2. Hardware Configuration of Digital Camera

Figure 2:
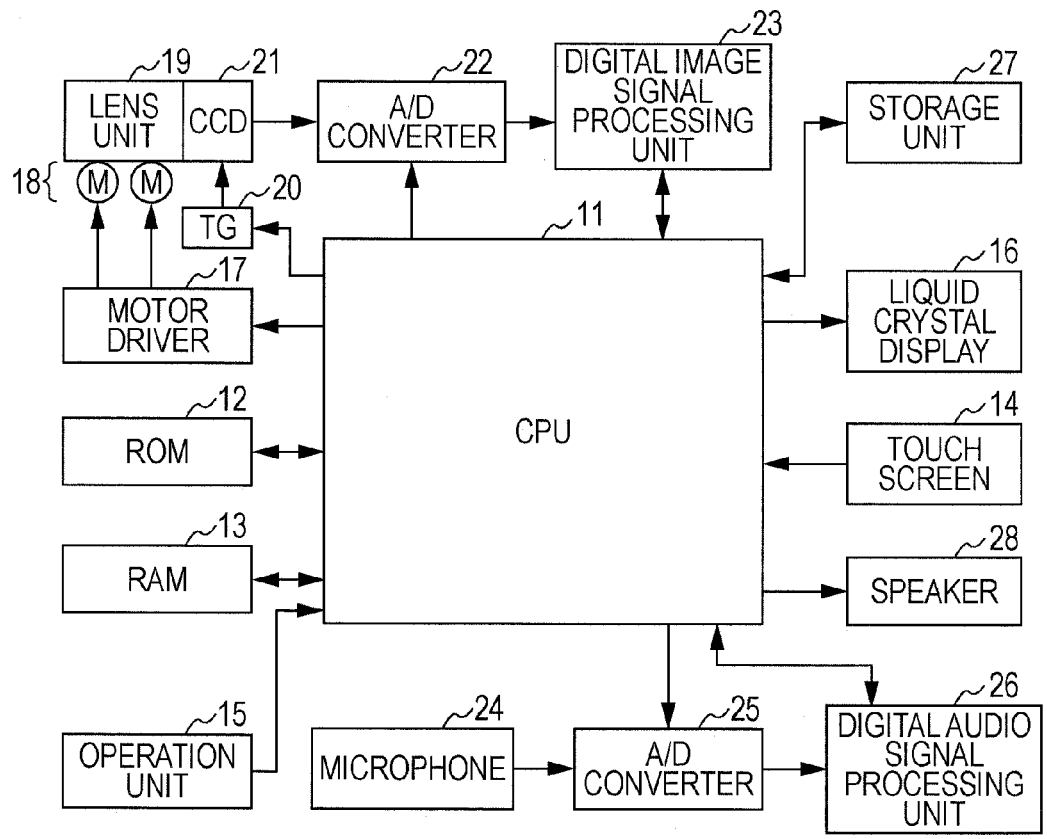
FIG. 2 is a schematic diagram showing the hardware configuration of a digital camera.

In FIG. 2, a reference numeral 10 denotes a digital camera, which is a specific example of the information processing device 1 described above.

The digital camera 10 performs various processings by a central processing unit (CPU) 11 loading a computer program stored in a read only memory (ROM) 12 to a random access memory (RAM) 13, and controls each constituent in response to an input signal from a touch screen 14 or an operation unit 15.

The touch screen 14 is provided on the display surface of a liquid crystal display 16, and, when an arbitrary point on the touch screen 14 is touched by a finger, the touch screen 14 detects a coordinate of the touched point (i.e., a touch point). The touch screen 14 then transmits an input signal corresponding to the coordinate of the touch point to the CPU 11.

The touch screen 14 is configured to keep transmitting the input signal indicative of the coordinate of the touch point to the CPU 11 at a predetermined time interval as long as it is touched.

Upon obtaining the coordinate of the touch point from the input signal transmitted from the touch screen 14, the CPU 11 recognizes what point is touched on the liquid crystal display 16 by converting the coordinate into a screen coordinate on the liquid crystal display 16.

The CPU 11 also recognizes the way the touch point moves (i.e., a trace of the touch point) by converting the coordinate of the touch point obtained from the input signal transmitted at the predetermined time interval into the screen coordinate on the liquid crystal display 16.

The CPU 11 then determines what touch operation is performed on what point on the screen based on the touch point and its trace recognized as described above.

The operation unit 15 is a device including a zoom lever (TELE/WIDE), a shooting button, a power button, and a mode switch button, and transmits to the CPU 11 an input signal corresponding to an operation of pressing each one of them.

The CPU 11 determines which one of the zoom lever, the shooting button, the power button, and the mode switch button is operated based on the input signal transmitted from the operation unit 15.

When the CPU 11 is instructed to switch an operation mode to a shooting mode by the operation on the mode switch button in the operation unit 15, the CPU 11 actually switches the operation mode to the shooting mode.

When the mode is switched to the shooting mode, the CPU 11 controls a motor driver 17 to drive an actuator 18, thereby exposing a lens unit 19 from a housing of the digital camera 10. The CPU 11 also adjusts an aperture of the lens unit 19 and moves a focus lens by driving the actuator 18.

At the same time, the CPU 11 controls a timing generator (TG) 20 to supply a timing signal to an imaging device 21 including a charge coupled device (CCD) and the like. By operating based on the timing signal, the imaging device 21 converts a light emitted from a subject and taken in through the lens unit 19 into an electric signal (i.e., photoelectric conversion) to obtain an analog image signal and supply it to an analog-digital converter (also referred to as an A/D converter) 22.

The A/D converter 22 obtains a digital image signal by performing an analog-digital conversion (A/D conversion) on the transmitted analog image signal, and supplies it to a digital image signal processing unit 23, under the control of the CPU 11.

The digital image signal processing unit 23 performs a digital signal processing (noise removal and the like) on the transmitted digital image signal, and supplies it to the liquid crystal display 16, under the control of the CPU 11. As a result, the liquid crystal display 16 displays an image of the subject as a monitoring image. Thus, the digital camera 10 allows the user to check an image of the subject.

At this time, the digital image signal processing unit 23 generates a graphics signal including an icon and a button and superimposes the graphics signal on the digital image signal, under the control of the CPU 11. As a result, the liquid crystal display 16 displays the icon and the button along with the monitoring image.

Suppose the shooting button in the operation unit 15 is pressed down in this state. The CPU 11 then recognizes that the shooting button is pressed down from the input signal transmitted from the operation unit 15 in response to the pressing of the shooting button, and starts recording a moving image.

That is, the digital image signal processing unit 23 generates moving image data by compressing the digital image signal transmitted from the A/D converter 22 in a predetermined moving image format under the control of the CPU 11.

A microphone 24 obtains an analog audio signal by converting collected sound into an electric signal, and supplies the analog audio signal to an A/D converter 25. The A/D converter 25 obtains a digital audio signal by performing the A/D conversion on the transmitted analog audio signal, and supplies the digital audio signal to a digital audio signal processing unit 26, under the control of the CPU 11.

The digital audio signal processing unit 26 generates audio data by compressing the digital audio signal transmitted from the A/D converter 25 in a predetermined audio format under the control of the CPU 11.

The CPU 11 then generates a video/audio data by multiplexing the audio data with the moving image data generated by the digital image signal processing unit 23, and stores the video/audio data in a storage unit 27.

When the shooting button is pressed down again, the CPU 11 terminates recording the moving image. In other words, the CPU 11 completes recording a series of the video/audio data from the start to the end of the shooting. The CPU 11 then stores the video/audio data in the storage unit 27 as a moving image file by adding header information to it. In this manner, the digital camera 10 records a moving image.

The header information of the moving image file may include, for example, a file name of the moving image file, recording date and time (i.e., shooting date and time), length of the moving image (i.e., time length), and the like.

The CPU 11 also manages all the moving image files stored in the storage unit 27 using a single moving image management file stored in the storage unit 27.

The moving image management file contains the file name, the shooting date and time, the time length, favor level setting information (to be described later), and the like with respect to each moving image file stored in the storage unit 27 as management information.

In other words, the CPU 11 is configured to add the management information of a new moving image file to the moving image management file every time a new moving image file is stored in the storage unit 27 (i.e., every time a moving image is recorded).

The management information of each moving image file contained in the moving image management file is associated with each moving image file stored in the storage unit 27 by the file name.

The storage unit 27 may be, for example, a nonvolatile memory of a few gigabytes to tens of gigabytes, such as a recording medium built in the digital camera 10 in advance, or a removable recording medium to be inserted in the digital camera 10 like a memory card.

On the other hand, when instructed to switch the operation mode to a reproduction mode through the operation unit 15, the CPU 11 switches the operation mode to the reproduction mode.

The CPU 11 reads a moving image file specified through, for example, the touch screen 14 from the storage unit 27, and separates the moving image data and the audio data from the moving image file. The CPU 11 then supplies the moving image data to the digital image signal processing unit 23, and the audio data to the digital audio signal processing unit 26.

The digital image signal processing unit 23 obtains the image signal before compression by decompressing the transmitted moving image data in the same moving image format as used when it was compressed, and supplies the image signal to the liquid crystal display 16, under the control of the CPU 11. As a result, the liquid crystal display 16 displays the moving image (reproduction image) corresponding to the selected moving image file.

At the same time, the digital image signal processing unit 23 generates a graphics signal including the icon and the button, and superimposes it on the digital image signal, under the control of the CPU 11. As a result, the liquid crystal display 16 displays the icon and the button along with the reproduction image.

The digital audio signal processing unit 26 obtains the audio signal before compression by decompressing the transmitted audio data in the same audio format as used when it was compressed, and supplies the audio signal to a speaker 28, under the control of the CPU 11. As a result, the speaker 28 outputs a sound corresponding to the selected moving image file. Thus, the digital camera 10 reproduces the moving image and the sound.

The CPU 11 of the digital camera 10 is the hardware corresponding to the control unit 2 of the information processing device 1 described earlier. The storage unit 27 of the digital camera 10 is the hardware corresponding to the recording medium 3 of the information processing device 1 described earlier. The liquid crystal display 16 of the digital camera 10 is the hardware corresponding to the output unit 4 and the display unit 6 of the information processing device 1 described earlier. The CPU 11 and the touch screen 14 of the digital camera 10 are the hardware corresponding to the reception unit 5 of the information processing device 1 described earlier. The digital image signal processing unit 23 of the digital camera 10 is the hardware corresponding to the reproduction unit 7 of the information processing device 1 described earlier. The lens unit 19 and the imaging device 21 of the digital camera 10 are the hardware corresponding to the imaging unit 8 of the information processing device 1 described earlier.

1-3. Setting of Favor Level

The digital camera 10 is configured so that a favor level can be set to the moving image with respect to each predetermined time period (for example, one second) while recording the moving image. The favor level indicates how much the user likes the moving image, and it can be specified by the user through the touch screen 14.

Figure 3A:
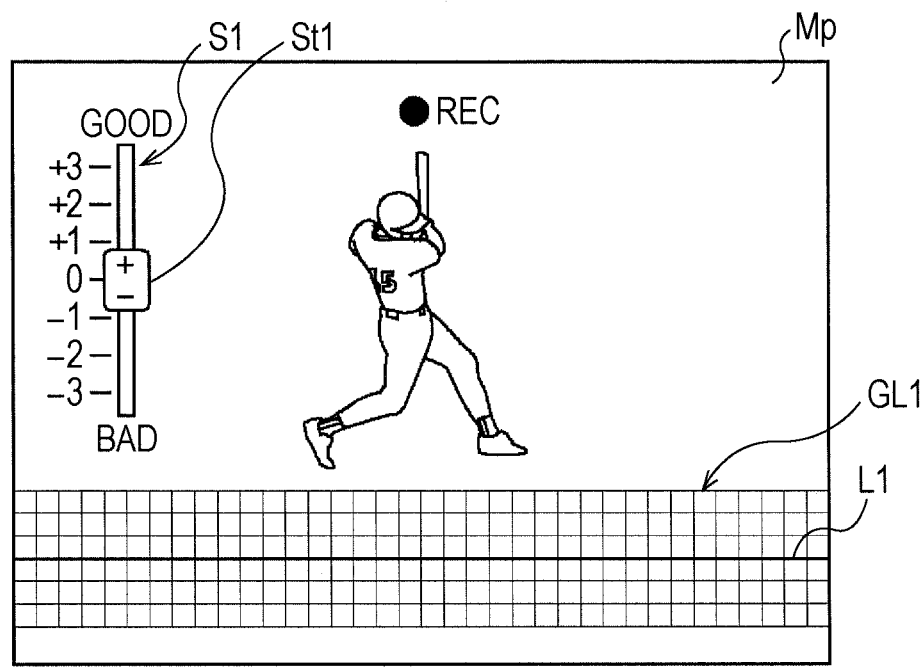
FIGS. 3A and 3B are schematic diagrams for explaining a setting of a favor level according to an embodiment.

The setting of the favor level is described below in detail. Upon switching the operation mode to the shooting mode, the CPU 11 displays a monitoring image Mp on the liquid crystal display 16 as shown in FIG. 3A.

When the user presses the shooting button, the CPU 11 starts recording a moving image. At the same time, the CPU 11 displays a slider bar S1 that allows the user to specify the favor level superimposed on the monitoring image Mp in a long rectangular shape so that its long axis indicate vertical directions.

The slider bar S1 is provided with a slider St1 capable of moving in the vertical directions. When the user touches the slider St1 through the touch screen 14, the CPU 11 moves the slider St1 up and down in response to a drag operation (an operation of moving a finger while touching the screen) of the user.

The slider bar S1 is configured to specify the favor level in units of, for example, "0.1" in a range between, for example, "+3" and "−3" by the user moving the slider St1 through the touch screen 14.

The slider bar S1 is calibrated in units of "1" from "+3" to "−3" so that the location of the slider St1 indicates what value of the favor level the user specifies.

The higher value the favor level is, the higher favor level is; the lower value the favor level is, the lower favor level is. "0" indicates that the favor level is neither high nor low (that is, neutral).

Based on the location of the slider St1 on the slider bar S1, the CPU 11 sets the favor level of the moving image currently recorded with respect to each predetermined time period.

For example, at the beginning of recording the moving image, the CPU 11 displays the slider St1 at the location of, for example, a tick mark "0" on the slider bar S1 as a default as shown in FIG. 3A. The CPU 11 sets the favor level of the predetermined time period of the moving image from the start of the recording of the moving image to "0".

In other words, for example, as long as the slider St1 is located at the tick mark "0" on the slider bar S1, the CPU 11 keeps setting the favor level to "0" with respect to each predetermined time period of the moving image.

Figure 3B:
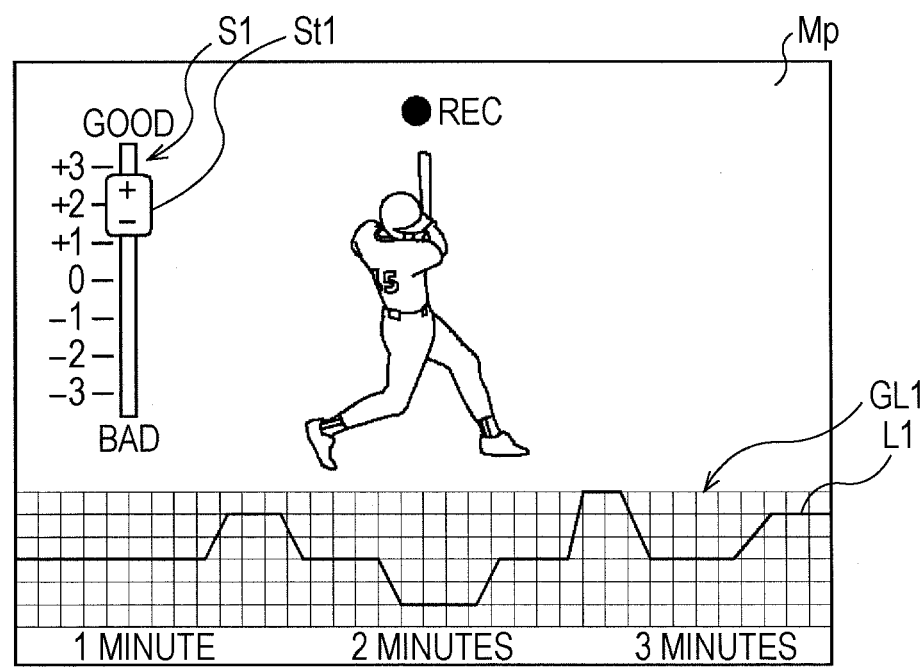

Furthermore, when the CPU 11 recognizes that the slider St1 has moved to the location of, for example, the tick mark "+2" on the slider bar S1 as shown in FIG. 3B, the CPU 11 recognizes that the user specified the favor level "+2". The CPU 11 then sets the favor level of the predetermined time period of the moving image from the time point at which the slider St1 moved to "+2".

In other words, for example, as long as the slider St1 is located at the tick mark "2" on the slider bar S1, the CPU 11 keeps setting the favor level to "2" with respect to each predetermined time period of the moving image.

Although the range of the favor level is between "+3" and "−3" in this embodiment, the range may be variable to be set according to a request from the user.

When the CPU 11 starts recording the moving image, the CPU 11 also displays a graph GL1 indicative of transition of the favor level with respect to each predetermined time period superimposed on the monitoring image Mp along with the slider bar S1.

In the graph GL1, a vertical axis indicates the favor level, and a horizontal axis indicates elapsed time since the start of the recording of the moving image. Each tick mark on the vertical axis indicates the favor level, for example, in units of "1", and each tick mark on the horizontal axis indicates, for example, five seconds. The rightmost end of the horizontal axis indicates the present time, and the leftmost end indicates, for example, three minutes before the present time.

In the graph GL1, the transition of the set favor level is indicated by a heavy line L1. The CPU 11 scrolls the graph GL1 to the left every time a predetermined time passes so that the rightmost end keeps showing the present time.

For example, FIG. 3A shows the graph GL1 at the time of starting recording the moving image. Because the favor level is not yet specified by the user at the time of starting recording the moving image, the CPU 11 indicates the favor level at "0" in the graph GL1.

FIG. 3B shows an example of the graph GL1 at the time point of, for example, three minutes thirty seconds after starting recording the moving image. The graph GL1 displayed at this time indicates the transition of the favor level with respect to each predetermined time period between the elapsed times of thirty seconds and three minutes thirty seconds after the start of the recording.

FIG. 3B shows a state in which the slider St1 is located at the tick mark "+2" on the slider bar S1, i.e., the state in which the user specifies the favor level "+2". Therefore, the CPU 11 sets the favor level at this time to "+2", and displays the graph GL1 so that the rightmost end of the heavy line L1 indicates the favor level "+2".

As described above, the CPU 11 is configured to set the favor level of the moving image currently recorded in real time with respect to each predetermined time period corresponding to the operation of the slider St1, while recording the moving image. The CPU 11 is also configured to display the transition of the favor level with respect to each predetermined time period on the liquid crystal display 16 in real time corresponding to the setting.

1-4. Favor Level Setting Procedure

An operation procedure for setting the favor level (also referred to below as a favor level setting procedure) RT1 described above is explained below with reference to FIG. 4. The favor level setting procedure RT1 is performed by the CPU 11 of the digital camera 10 according to the computer program stored in the ROM 12.

When the CPU 11 recognizes that the shooting button is pressed down by the user, the CPU 11 initiates the favor level setting procedure RT1 and moves to Step SP1.

At Step SP1, the CPU 11 starts recording a moving image, displays the slider bar S1 superimposed on the monitoring image Mp, and moves to Step SP2.

At Step SP2, the CPU 11 recognizes the location of the slider St1 on the slider bar S1, and moves to Step SP3.

At Step SP3, the CPU 11 sets the favor level for a predetermined time period of the moving image from the present time based on the location of the slider St1 on the slider bar S1, and moves to Step SP4.

At Step SP4, the CPU 11 generates the favor level setting information including the set favor level associated with the time period for which the favor level is set (i.e., the predetermined time period from the present time). The CPU 11 then temporarily stores the favor level setting information in the RAM 13, and moves to Step SP5.

At Step SP5, the CPU 11 determines whether a predetermined time has passed since the location of the slider St1 was recognized at Step SP2.

If the result of the determination at Step SP5 is negative, the CPU 11 returns to Step SP5 and waits until the predetermined time has passed since the location of the slider St1 was recognized.

On the other hand, if the result of the determination at Step SP5 is positive because the predetermined time has passed since the location of the slider St1 was recognized, the CPU 11 moves to Step SP6.

At Step SP6, the CPU 11 determines whether the shooting button is pressed again by the user to instruct to terminate recording the moving image.

If a negative result is obtained at Step SP6, the CPU 11 returns to Step SP2 to perform Step SP2 to Step SP6 again.

On the other hand, if a positive result is obtained at Step SP6 by being instructed to terminate recording the moving image, the CPU 11 moves to Step SP7.

At Step SP7, the CPU 11 terminates recording the moving image, and stores the moving image in the storage unit 27 as a moving image file. The CPU 11 also stores the favor level setting information generated with respect to each predetermine time period in the moving image management file along with the file name of the moving image file and the like as the management information of the moving image file. The CPU 11 then terminates the favor level setting procedure RT1.

By the favor level setting procedure RT1 as described above, the CPU 11 sets the favor level for each predetermined time period of the moving image until the recording of the moving image is terminated.

1-5. Favorite Reproduction

The digital camera 10 is also configured to reproduce the moving image based on the favor level set during the recording of the moving image. The reproduction of the moving image based on the favor level (also referred to as favorite reproduction) is explained below.

Figure 5A:
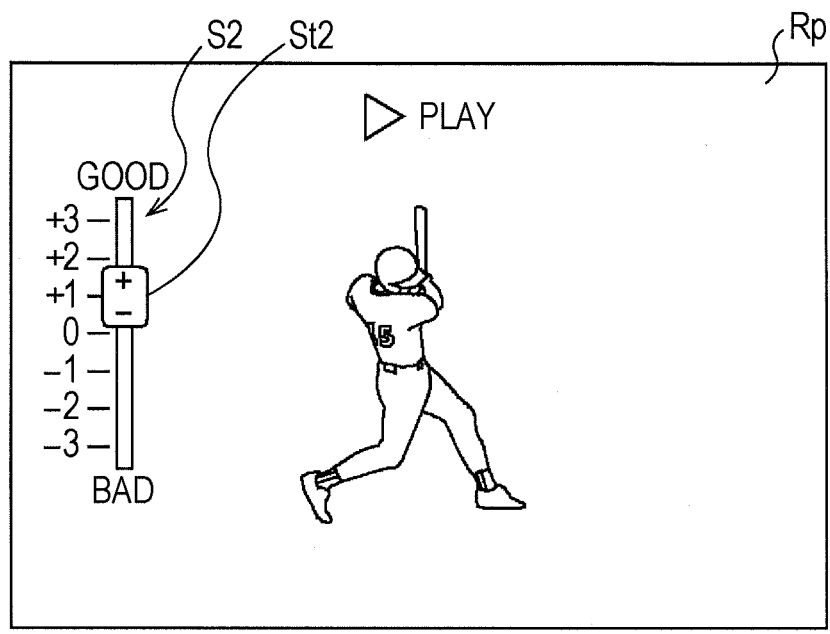
FIGS. 5A and 5B are schematic diagrams for explaining a favorite reproduction according to the embodiment.

When the CPU 11 reproduces a moving image selected by the user through the touch screen 14 in the reproduction mode, the CPU 11 displays a reproduction image Rp on the liquid crystal display 16 as shown in FIG. 5A. At the same time, the CPU 11 also displays a slider bar S2 that allows the user to specify a threshold of the favor level for reproducing the moving image (also referred to below as a favorite reproduction threshold) superimposed on the reproduction image Rp.

The slider bar S2 is provided with a slider St2 capable of moving in the vertical directions in response to the user operation through the touch screen 14 as in the above-described case of setting the favor level.

The slider bar S2 is configured to specify the favorite reproduction threshold in the same range as in the above-described case of setting the favor level, i.e. in the range between "+3" and "−3", by the user moving the slider St2 through the touch screen 14.

The slider bar S2 is also calibrated in units of "1" from "+3" to "−3" so that the location of the slider St2 indicates the value of the favorite reproduction threshold the user specifies.

The CPU 11 sets the favorite reproduction threshold based on the location of the slider St2 on the slider bar S2.

For example, when the CPU 11 recognizes that the slider St2 is located at the location of, for example, a tick mark "+1" on the slider bar S2 as shown in FIG. 5A, the CPU 11 recognizes that "+1" is specified by the user as the favorite reproduction threshold. The CPU 11 then sets the favorite reproduction threshold to "+1".

The CPU 11 then reproduces only parts of the content with the favor level no lower than "+1" skipping parts of the content with the favor level less than "+1" based on the favor level set to the moving image under reproduction.

Figure 5B:
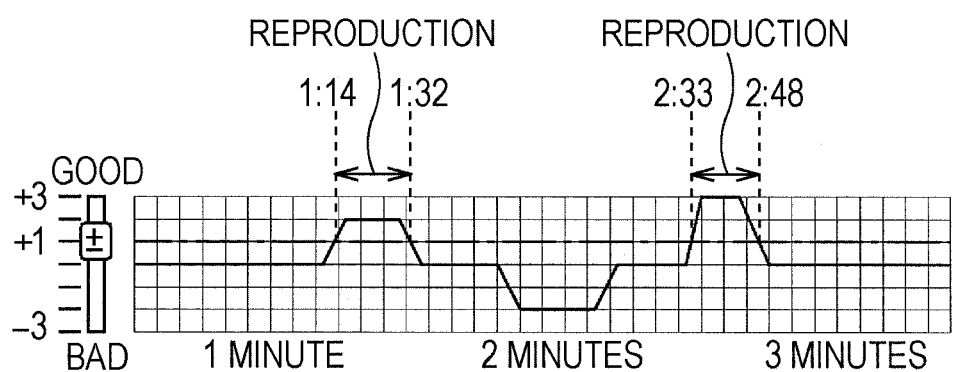

For example, as shown in FIG. 5B, assume that the favor level is set to "+1" or higher between elapsed times of one minute fourteen seconds and one minute thirty-two seconds and between the elapsed times of two minutes thirty-three seconds and two minutes forty-eight seconds of the moving image under reproduction. In this case, the CPU 11 skips to the elapsed time of one minute fourteen seconds, reproduces the moving image between the elapsed time of one minute fourteen seconds and one minute thirty-two seconds, skips to the elapsed time of two minutes thirty-three seconds, and reproduces the moving image between the elapsed times of two minutes thirty-three seconds and two minutes forty-eight seconds.

As a result, the user can watch the part of the moving image of which the favor level is no lower than the specified value of "+1".

In this manner, the CPU 11 is configured to extract and reproduce the part of which the favor level is set no lower than the favorite reproduction threshold from the moving image under reproduction.

The CPU 11 also sets the favorite reproduction threshold to, for example, "+2" when it recognizes that the slider St2 moved from the tick mark "+1" on the slider bar S2 to the tick mark "+2" during the reproduction of the moving image. The CPU 11 then extracts only the parts of which the favor level is set no lower than "+2" from the moving image and reproduces it.

As described above, the CPU 11 is also configured to change the favorite reproduction threshold when the slider St2 is moved by the user operation through the touch screen 14 during the reproduction of the moving image.

1-6. Favorite Reproduction Procedure

An operation procedure of the favorite reproduction (also referred to below as a favorite reproduction procedure) RT2 described above is explained below with reference to FIG. 6. The favorite reproduction procedure RT2 is performed by the CPU 11 of the digital camera 10 according to the computer program stored in the ROM 12.

When instructed to reproduce a moving image through the touch screen 14, the CPU 11 initiates the favorite reproduction procedure RT2 and moves to Step SP101.

At Step SP101, the CPU 11 starts reproducing the moving image, displays the slider bar S2 superimposed on the reproduction image Rp, and moves to Step SP2.

At Step SP102, the CPU 11 reads out the favor level setting information stored in the moving image management file, and moves to Step SP103.

At Step SP103, the CPU 11 determines whether stop of the reproduction of the moving image is instructed through the touch screen 14 or whether the moving image has been reproduced to the end.

If a negative result is obtained at Step SP103, the CPU 11 moves to Step SP104.

At Step SP104, the CPU 11 recognizes the location of the slider St2 on the slider bar S2, and moves to Step SP105.

At Step SP105, the CPU 11 sets the favorite reproduction threshold based on the location of the slider St2 on the slider bar S2, and moves to Step SP106.

At Step SP106, the CPU 11 determines whether the favor level set for the current reproduction point is equal to or higher than the favorite reproduction threshold based on the favor level setting information read from the moving image management file.

If a positive result is obtained at Step SP106, it means that the moving image at the current reproduction point should be reproduced, and the CPU 11 moves to Step SP107 in this case.

At Step SP107, the CPU 11 determines again whether stop of the reproduction of the moving image is instructed through the touch screen 14 or whether the moving image has been reproduced to the end.

If a negative result is obtained at Step SP107, the CPU 11 returns to Step SP104 to recognize the location of the slider St2 again.

On the other hand, if a negative result is obtained at Step SP106 because the favor level set at the current reproduction point is lower than the favorite reproduction threshold, it means that the current reproduction point of the moving image should not be reproduced. In this case, the CPU 11 moves to Step SP108.

At Step SP108, the CPU 11 skips the reproduction point to a time point at which the favor level is set no lower than the favorite reproduction threshold based on the favor level setting information read from the moving image management file, and returns to Step SP103.

If a positive result is obtained at Step SP103 or Step SP107 either because the stop of the reproduction of the moving image is instructed or because the moving image has been reproduced to the end, the CPU 11 terminates the reproduction of the moving image, and terminates the favorite reproduction procedure RT2.

By the favorite reproduction procedure RT2 as described above, the CPU 11 extracts only the part for which the favor level is set no lower than the favorite reproduction threshold from the moving image and reproduces the extracted part of the moving image until the reproduction of the moving image is terminated.

1-7. Operation and Effect of the Embodiment

In the configuration described above, the CPU 11 of the digital camera 10 sets a favor level specified by the user input with respect to each predetermined time period of the moving image being recorded, among a plurality of sequential favor levels such as "+1", "0", "−1", . . . . The CPU 11 also stores the favor level associated with the predetermined time period of the moving image being recorded in the storage unit 27.

At the time of reproducing the moving image, the CPU 11 makes the digital image signal processing unit 23 extract only a part with which the favor level no lower than the threshold of the favor level specified by the user input is associated from the moving image and reproduce the part of the moving image.

In this manner, the digital camera 10 can make the digital image signal processing unit 23 extract the desired part from the moving image and reproduce it only by letting the user specify the desired threshold of the favor level. The digital camera 10 can also make the digital image signal processing unit 23 extract and reproduce another desired part of the moving image instead only by letting the user change the specification.

The CPU 11 also displays the slider bar S1 having a slider St1 capable of moving in the vertical directions in response to the drag operation performed by the user through the touch screen 14 on the liquid crystal display 16 while displaying the recorded moving image on the liquid crystal display 16.

The CPU 11 also sets the favor level with respect to each predetermined time period of the moving image being recorded based on the location of the slider St1 on the slider bar 81.

Thus by setting the favor level based on the user input received while displaying the moving image being recorded on the liquid crystal display 16, the CPU 11 allows the user to specify the favor level while checking the moving image currently recorded.

Furthermore, the CPU 11 allows the user to specify the favor level by an intuitive operation because the CPU 11 is configured to set the favor level based on the location of the slider St1 capable of moving in the vertical directions in response to the user operation.

Moreover, the CPU 11 displays the transition of the favor level set for the moving image recorded to this moment with respect to each predetermined time period on the liquid crystal display 16 in the form of a graph along with the corresponding moving image.

In this manner, the digital camera 10 allows the user to easily check the transition of the favor level set to this moment with respect to each predetermined time period while checking the moving image currently recorded.

According to the above configuration, the digital camera 10 stores the favor level specified by the user input among a plurality of sequential favor levels in the storage unit 27 in association with each predetermined time period of the moving image.

In this manner, the digital camera 10 can extract the part of the moving image with which the favor level no lower than the threshold specified by the user input at the time of reproducing the moving image and make the digital image signal processing unit 23 reproduce it. The digital camera 10 can also make the digital image signal processing unit 23 extract and reproduce another desired part of the moving image instead only by letting the user change the specification.

Thus, the digital camera 10 can make the digital image signal processing unit 23 perform the reproduction of the moving image satisfying various requests of the user.

2. Another Embodiment

Another embodiment of the present invention will be explained below. Unlike the embodiment described earlier, the digital camera 10 according to the other embodiment is configured to set a person attribute with respect to each predetermined time period of the moving image. The person attribute indicates to which person the user pays attention with respect to each predetermined time period of the moving image, and it can be specified by the user through the touch screen 14.

The other embodiment is identical to the embodiment described earlier except that the person attribute is set instead of the favor level, and therefore the duplicate explanation of the hardware configuration of the digital camera 10 (FIG. 2) is omitted.

2-1. Setting of Person Attribute

The setting of the person attribute is described below in detail. The digital camera 10 according to the other embodiment is registered with person names of, for example, two persons input by the user in advance as the person names used as the person attribute. It is assumed here that, for example, "Baby A" and "Baby B" are registered as the person names.

Figure 7:
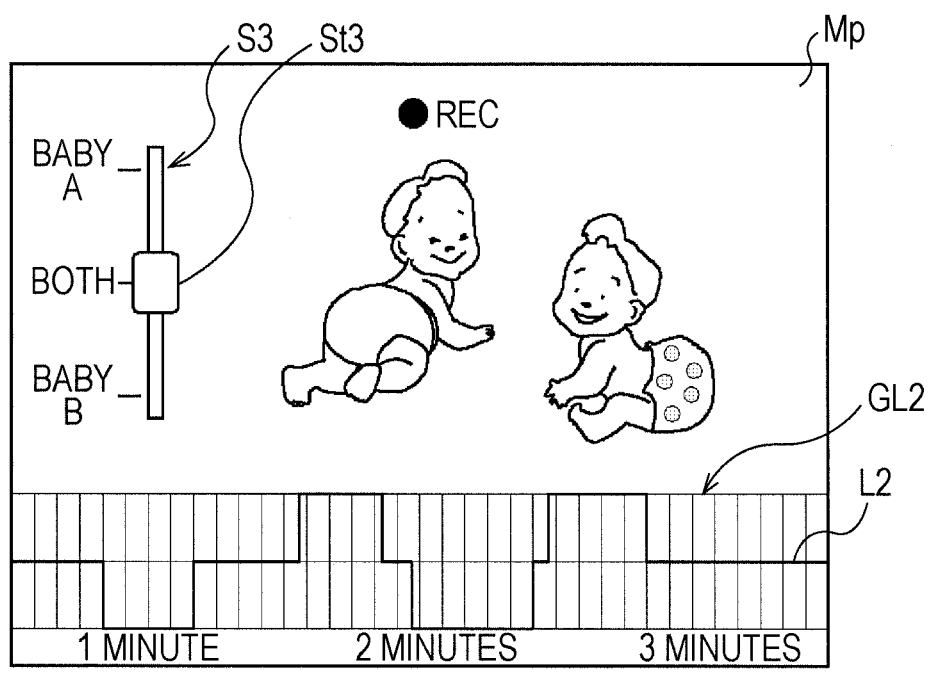
FIG. 7 is a schematic diagram for explaining a setting of a person attribute according to another embodiment.

When the user presses down the shooting button, the CPU 11 starts recording the moving image and, as shown in FIG. 7, displays a slider bar S3 that allows the user to specify the person attribute superimposed on the monitoring image Mp.

The slider bar S3 is provided with a slider St3 capable of moving in the vertical directions in response to the user operation through the touch screen 14 as in the above-described case of setting the favor level.

The slider bar S3 is configured to specify the person attribute by the user moving the slider St3 through the touch screen 14. Specifically, the slider bar S3 is configured to specify any one of three person attributes "Baby A", "Baby B", and "Both" indicative of both "Baby A" and "Baby B".

The CPU 11 sets sequentiality of the three person attributes "Baby A", "Baby B", and "Both" centered at "Both" to be either "Baby A">"Both">"Baby B" or "Baby A"<"Both"<"Baby B".

For example, when the sequentiality "Baby A">"Both">"Baby B" is set, tick marks respectively indicative of "Baby A", "Both", and "Baby B" in the order from the top are displayed on the slider bar S3.

The person attribute "Baby A" is specified, for example, when the user pays attention to "Baby A" alone, and the person attribute "Baby B" is specified, for example, when the user pays attention to "Baby B" alone. The person attribute "Both" is specified, for example, when the user pays attention to both "Baby A" and "Baby B".

The CPU 11 sets the person attribute with respect to each predetermined time interval of the moving image being recorded based on the location of the slider St3 on the slider bar S3.

For example, at the beginning of recording the moving image, the CPU 11 displays the slider St3 at the location of, for example, the tick mark "Both" on the slider bar S3 as a default. The CPU 11 then sets the person attribute of the predetermined time period of the moving image from the start of the recording of the moving image to "Both".

In other words, for example, as long as the slider St3 is located at the tick mark "Both" on the slider bar S3, the CPU 11 keeps setting the person attribute to "Both" with respect to each predetermined time period of the moving image.

Furthermore, when the CPU 11 recognizes that the slider St3 has moved to the location of, for example, the tick mark "Baby A" on the slider bar S3, the CPU 11 recognizes that the user specified the person attribute "Baby A". The CPU 11 then sets the person attribute of the predetermined time period of the moving image from the time point at which the slider moved to "Baby A".

In other words, for example, as long as the slider St3 is located at the tick mark "Baby A" on the slider bar S3, the CPU 11 keeps setting the person attribute to "Baby A" with respect to each predetermined time period of the moving image.

When the person attribute is set, the CPU 11 generates person attribute setting information including the set person attribute associated with the time period for which the person attribute is set (i.e., the predetermined time period from the present time). When the recording of the moving image is terminated, the CPU 11 stores the person attribute setting information in the moving image management file as the management information of the moving image file.

When the CPU 11 starts recording the moving image, the CPU 11 also displays a graph GL2 indicative of transition of the person attribute with respect to each predetermined time period superimposed on the monitoring image Mp along with the slider bar S3.

In the graph GL2, a vertical axis indicates the person attribute, and a horizontal axis indicates elapsed time since the start of the recording of the moving image. Each tick mark on the vertical axis indicates the person attribute "Baby A", "Both", and "Baby B" in the order from the top, and each tick mark on the horizontal axis indicates, for example, five seconds. In the graph GL2, the person attributes set in the past are also indicated by a heavy line L2.

As described above, the CPU 11 is configured to set the person attribute of the moving image currently recorded in real time with respect to each predetermined time period corresponding to the operation of the slider St3, while recording the moving image. The CPU 11 is also configured to display the transition of the person attribute with respect to each predetermined time period on the liquid crystal display 16 in real time corresponding to the setting.

2-2. Reproduction Based on Person Attribute

The digital camera 10 is also configured to reproduce the moving image based on the person attribute set during the recording of the moving image. The reproduction of the moving image based on the person attribute is explained below.

Figure 8A:
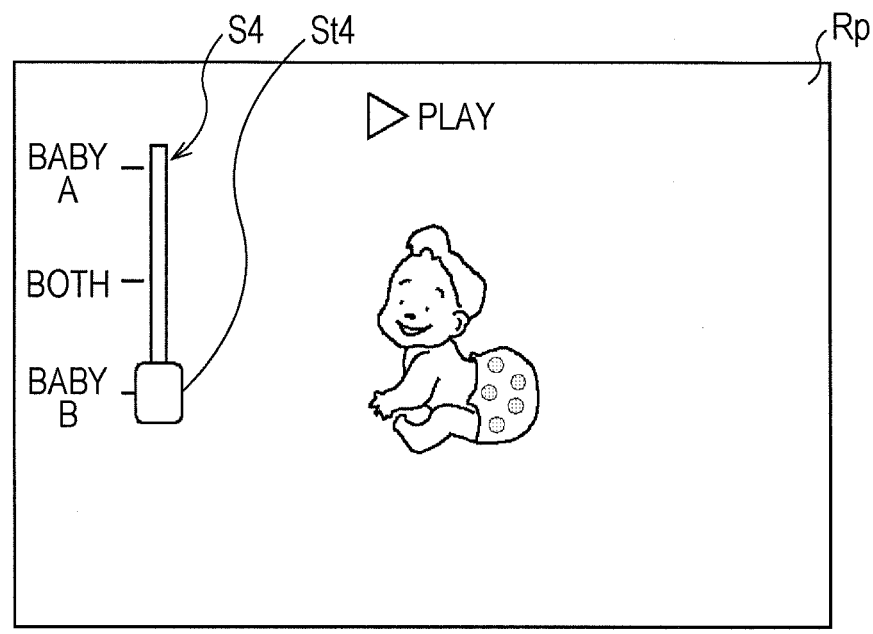

When the CPU 11 reproduces a moving image selected by the user through the touch screen 14 in the reproduction mode, the CPU 11 displays the reproduction image Rp on the liquid crystal display 16 as shown in FIG. 8A. At the same time, the CPU 11 also displays a slider bar S4 that allows the user to specify a value of the person attribute for reproducing the moving image (also referred to below as a reproduction person attribute value) superimposed on the reproduction image Rp.

The slider bar S4 is provided with a slider St4 capable of moving in the vertical directions in response to the user operation through the touch screen 14 as in the above-described case of setting the person attribute.

The slider bar S4 is displayed with the tick marks respectively indicative of "Baby A", "Both", and "Baby B" in the order from the top so that any one of the three person attributes "Baby A", "Baby B", and "Both" can be specified as in the above-described case of setting the person attribute.

The CPU 11 sets the reproduction person attribute value based on the location of the slider St4 on the slider bar S4.

For example, when the CPU 11 recognizes that the slider St4 is located at the location of, for example, the tick mark "Baby B" on the slider bar S4 as shown in FIG. 8A, the CPU 11 recognizes that "Baby B" is specified by the user as the reproduction person attribute value. The CPU 11 then sets the reproduction person attribute value to "Baby B".

Figure 8B:
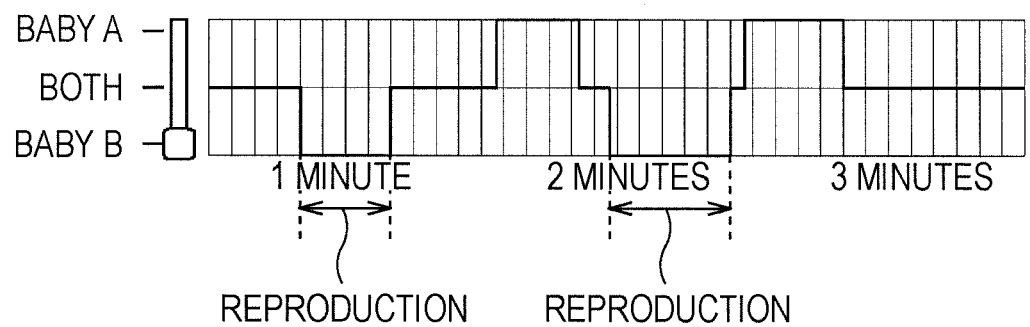

The CPU 11 then reproduces only parts of the moving image where the person attribute is set to "Baby B" skipping parts of the moving image where the person attribute is set to either "Baby A" or "Both" based on the person attribute set for the moving image under reproduction, as shown in FIG. 8B.

As a result, the user can watch the part of the moving image where "Baby B" is paid attention to.

Figure 9A:
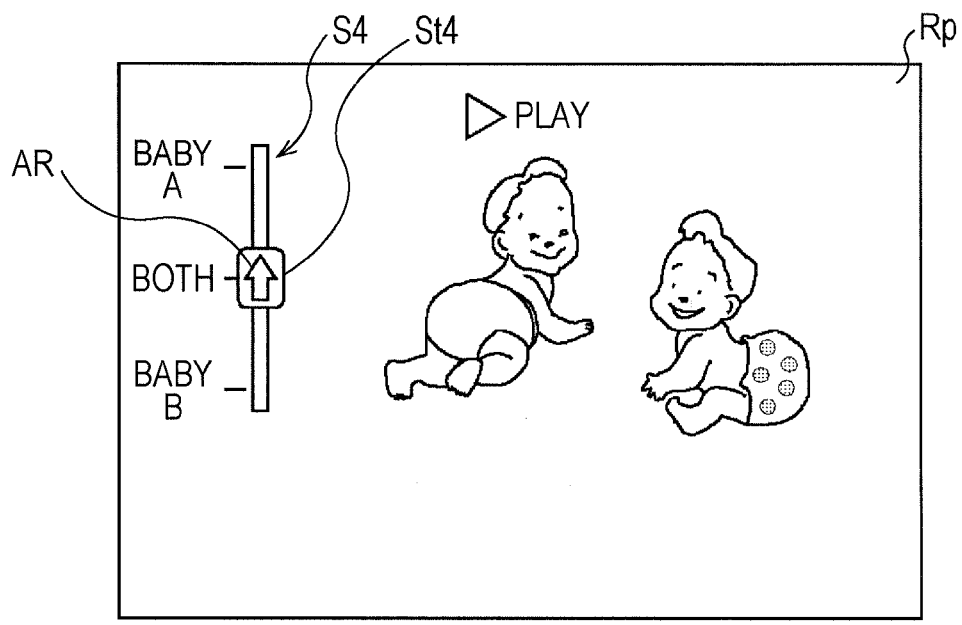
FIGS. 9A and 9B are schematic diagrams for explaining another reproduction based on the person attribute according to the embodiment.

Furthermore, when the CPU 11 recognizes that a double tap operation (an operation of performing a tapping operation two times in a row, the tapping operation being an operation of touching the touch screen 14 and leaving it immediately) is performed on the slider St4, the CPU 11 displays an arrow AR directed upward on the slider St4 as shown in FIG. 9A.

At this time, as soon as the CPU 11 recognizes that the slider St4 is located at the location of, for example, the tick mark "Both" on the slider bar S4, the CPU 11 sets the reproduction person attribute value to no lower than "Both" (i.e., "Both" and "Baby A").

That is, the digital camera 10 is configured to set the reproduction person attribute value no lower than the person attribute corresponding to the location of the slider St4 when the arrow AR directed upward is displayed.

Figure 9B:
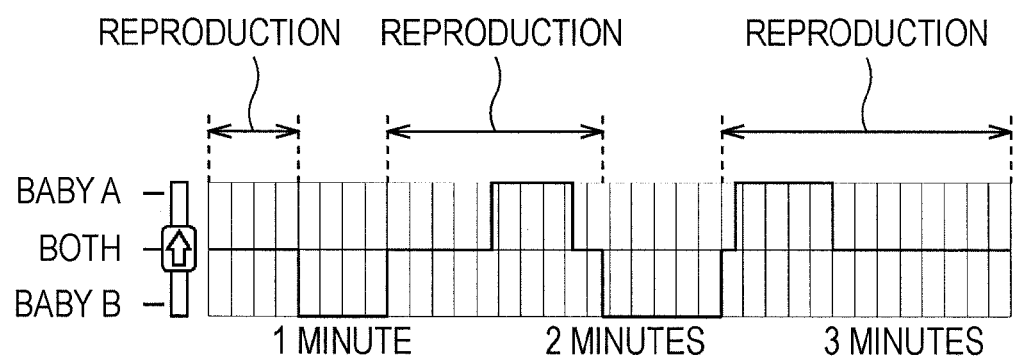

The CPU 11 then reproduces only parts of the moving image where the person attribute is set no lower than "Both" (i.e., "Both" and "Baby A") skipping parts of the moving image where the person attribute is set to "Baby B" based on the person attribute set for the moving image, as shown in FIG. 9B.

As a result, the user can watch the part of the moving image where "Baby A" is paid attention to and the part of the moving image where both "Baby A" and "Baby B" are paid attention to.

Furthermore, when the CPU 11 recognizes that the double tap operation is performed on the slider St4 in a state where the arrow AR is directed upward, the CPU 11 displays the arrow AR directed downward on the slider St4.

At this time, as soon as the CPU recognizes that the slider St4 is located at the location of, for example, the tick mark "Both" on the slider bar S4, the CPU 11 sets the reproduction person attribute value to no higher than "Both" (i.e., "Both" and "Baby B").

That is, the digital camera 10 is configured to set the reproduction person attribute value no higher than the person attribute corresponding to the location of the slider St4 when the arrow AR directed downward is displayed.

The CPU 11 is configured to hide the arrow AR when the CPU 11 recognizes that the double tap operation is performed on the slider St4 in a state where the arrow AR is directed downward.

As described above, the CPU 11 is configured to allow the user to specify a single person attribute or a range of person attributes as the reproduction person attribute value, and extract the part to be reproduced where the person attribute is set to the reproduction person attribute value from the moving image under reproduction.

2-3. Operation and Effect of the Embodiment

In the configuration described above, the CPU 11 of the digital camera 10 sets a person attribute specified by the user input with respect to each predetermined time period of the moving image being recorded, among a plurality of person attributes to which sequentiality "Baby A">"Both">"Baby B" is set. The CPU 11 also stores the person attribute associated with the predetermined time period of the moving image being recorded in the storage unit 27.

In this manner, at the time of reproducing the moving image, the digital camera 10 can extract the part of the moving image with which the person attribute specified by the user input is associated and make the digital image signal processing unit 23 reproduce the extracted part of the moving image.

The digital camera 10 can also make the user specify not only "Baby A" but also a range no lower than "Both" (i.e., "Both" and "Baby A") as the person attribute by letting a plurality of person attributes have sequentiality at the time of reproducing the moving image.

Thus, the digital camera 10 can extract a desired part from the moving image and reproduce it only by letting the user specify the desired person attribute or the desired range, and it can also extract and reproduce another desired part of the moving image instead only by changing the specification.

As described above, the digital camera 10 can make the digital image signal processing unit 23 perform the reproduction of the moving image satisfying various requests of the user.

In addition to the above, the digital camera 10 according to the embodiment can produce substantially same effects as those of the digital camera 10 according to the embodiment described earlier.

3. Modifications 3-1. First Modification

In the embodiment described first, the CPU 11 is configured to set the favor level of the predetermined time period of the moving image from the present time according to the location of the slider St1 on the slider bar S1.

Alternatively, the CPU 11 may be configured to set the favor level of the predetermined time period of the moving image from a time point back in the past.

Figure 10:
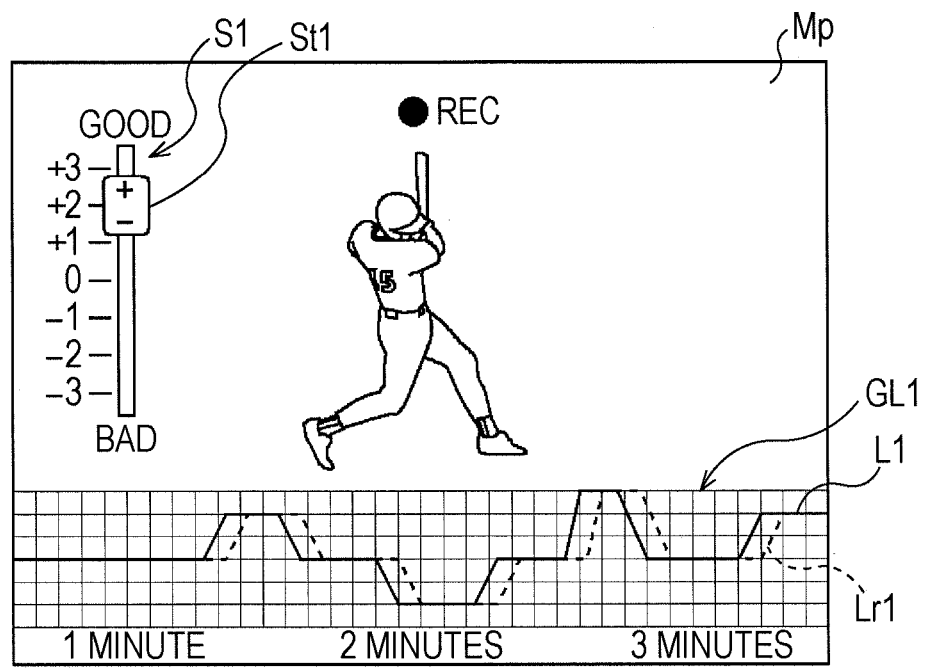
FIG. 10 is a schematic diagram for explaining a setting of the favor level according to a first modification.

For example, the transition of the actual location of the slider St1 is indicated by a dashed line Lr1 and the transition of the set favor level is indicated by a heavy line L1 in FIG. 10.

In this case, for example, because the slider St1 moves to the location of the tick mark "+2" on the slider bar S1 at the elapsed time of three minutes twenty seconds, the CPU 11 sets the favor level of the predetermined time period from, for example, three minutes fifteen seconds, which is five seconds going back from that time point, to "+2".

Because the user often concentrates on shooting during the shooting of the moving image, the user may move the slider St1 not on the very moment but a few moments after finding a favorite scene.

Therefore, by setting the favor level for the predetermined time period of the moving image from the time point in the past, it is possible to set the favor level further reflecting the user's intention.

3-2. Second Modification

In the embodiment described first, the CPU 11 is configured to set the favor level based on the location of slider St1 operated by the user on the slider bar S1.

Alternatively, the CPU 11 may be configured to set the favor level based on various gestural operations on the touch screen 14.

For example, the CPU 11 may be configured to set the favor level based on an operation of a finger touching on the touch screen 14 and then lightly sweeping (also referred to below as a flick operation).

Figure 11:
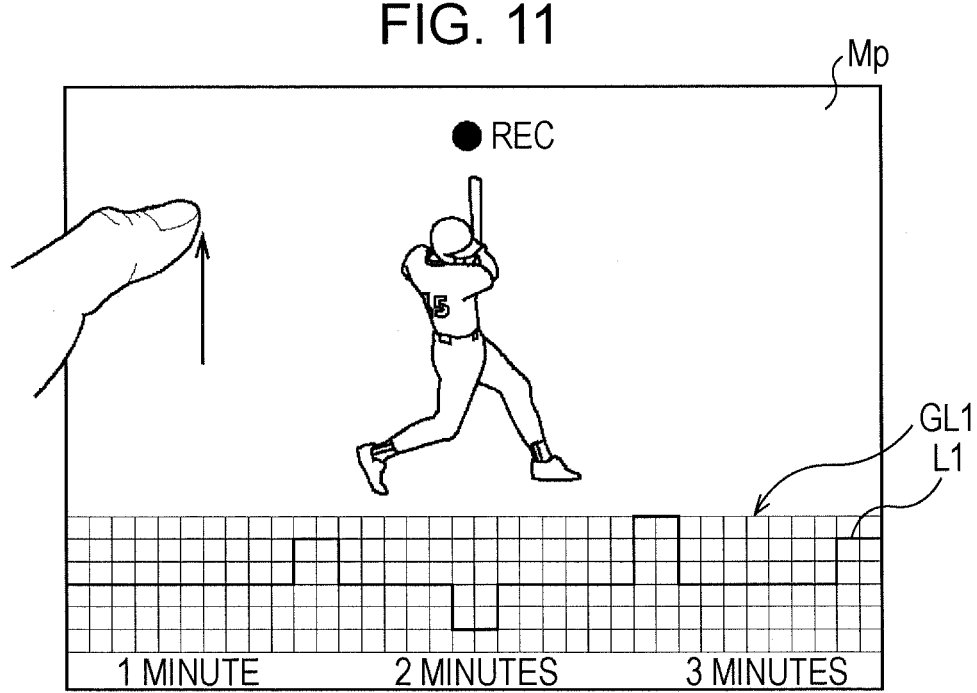
FIG. 11 is a schematic diagram for explaining another setting of the favor level according to a second modification.

In this case, the CPU 11 sets the favor level to a positive value when the flick operation is performed upward as shown in FIG. 11, and to a negative value when the flick operation is performed downward.

The CPU 11 may be configured to determine the value of the favor level based on the distance and the speed of the motion of the finger in the flick operation, i.e., the distance and the speed of the motion of the touch point. In other words, the CPU 11 increases an absolute value of the favor level as the distance of the motion of the touch point is longer and the speed is higher, and decreases the absolute value of the favor level as the distance of the motion of the touch point is shorter and the speed is lower.

While the CPU 11 keeps setting the favor level to the value based on the flick operation for a predetermined time (for example, ten seconds) after the flick operation is performed, the CPU 11 may be configured to return the favor level to the neutral after the predetermined time.

3-3. Third Modification

In the embodiment described first, the CPU 11 is configured to set the favor level based on the location of the slider St1 operated by the user on the slider bar S1.

Alternatively, the CPU 11 may be configured to set the favor level based on the user operation performed on the graph GL1 (FIGS. 3A and 3B) indicative of the transition of the favor level with respect to each predetermined time period.

For example, the CPU 11 may be configured to set the favor level based on a drag operation performed on the heavy line L1 on the graph GL1 so as to change the favor level.

In this case, when the drag operation is performed on the rightmost end (indicative of the present time) of the heavy line L1 on the graph GL1 so as to change the favor level, for example, from "+2" to "0", the CPU 11 sets the favor level at the time point on which the drag operation is performed to "0".

Otherwise, the CPU 11 may be configured to display various buttons and icons and set the favor value based on the user operation on the buttons and icons.

Figure 12:
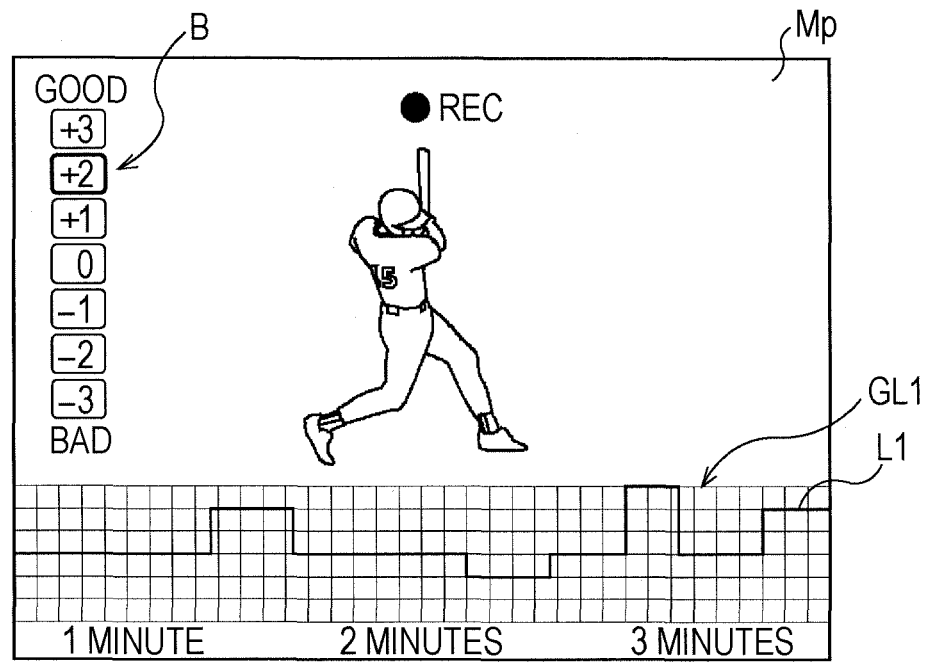
FIG. 12 is a schematic diagram for explaining still another setting of the favor level according to a third modification.

For example, to let the user specify the favor level within a range from "+3" to "−3", as shown in FIG. 12, the CPU 11 displays favor level setting buttons B including seven buttons respectively indicative of "+3", "+2", "+1", "0", "−1", "−2", and "−3" superimposed on the monitoring image Mp.

When the CPU 11 recognizes that, for example, the favor level setting button B indicative of "+2" is specified through the touch screen 14, the CPU 11 sets the favor level for the predetermined time period of the moving image from the present time to "+2".

Furthermore, the CPU 11 may emphasize the favor level setting button B indicative of the specified value to indicate which value the favor level is set to at the present time.

3-4. Fourth Modification

In the embodiment described first, the CPU 11 is configured to set the favor level with respect to each predetermined time period of the moving image while recording the moving image.

Alternatively, the CPU 11 may be configured to set the favor level with respect to each predetermined time period of the moving image while reproducing the moving image.

Otherwise, the CPU 11 may be configured to change the favor level set at the time of recording the moving image to another value while reproducing the moving image.

Figure 13:
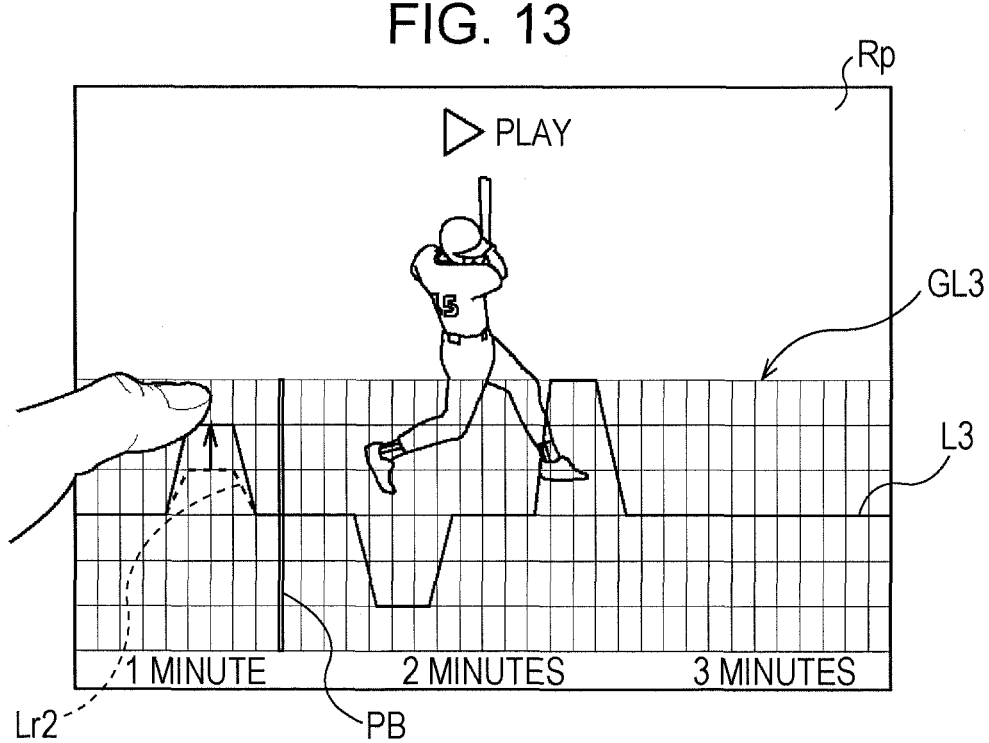
FIG. 13 is a schematic diagram for explaining a correction of the favor level according to a fourth modification.

In this case, when the moving image is reproduced, the CPU 11 displays the reproduction image Rp on the liquid crystal display 16 as shown in FIG. 13. At the same time, the CPU 11 reads the favor level setting information of the corresponding moving image from the moving image management file, generates a graph GL3 indicative of transition of the favor level with respect to each predetermined time period based on the favor level setting information, and displays the graph GL3 superimposed on the reproduction image Rp.

In the graph GL3, like the graph GL1 displayed during the recording of the moving image described earlier, the vertical axis indicates the favor level, the horizontal axis indicates the elapsed time since the start of the recording of the moving image, and a heavy line L3 indicates the transition of the set favor level.

The graph GL3 is also provided with a reproduction bar PB indicative of the reproduction point of the moving image, and the reproduction bar PB moves from the left to the right according to the reproduction of the moving image. Accordingly, the CPU 11 enables the user to see what point is currently reproduced.

When the user performs a drag operation on the heavy line L3 through the touch screen 14, the CPU 11 changes the favor level based on the drag operation.

For example, the heavy line L3 before correction is indicated by a dashed line Lr2 in FIG. 13. For example, assume that the favor level of the period between elapsed times fifty-five seconds and one minute five seconds was set to "+1" before correction.

In this state, the user performs a drag operation to move a point of the heavy line L3 corresponding to the period between elapsed times fifty-five seconds and one minute five seconds from the favor level "+1" to "+2".

At this time, the CPU 11 moves the point of the heavy line L3 corresponding to the period between the elapsed times fifty-five seconds and one minute five seconds to the location of the favor level "+2" in response to the drag operation, and changes the favor level for the period between the elapsed times fifty-five seconds and one minute five seconds to "+2".

The CPU 11 then updates the favor level setting information in the moving image management file corresponding to the changed favor level. That is, the CPU 11 stores the new favor level in the storage unit 27 in association with the time period corresponding to the new favor level.

Because the user often concentrates on shooting during the shooting of the moving image, the user may not often move the slider St1, and the CPU 11 may not be able to set the favor level that satisfies the user's request. Therefore, by changing the favor level set at the time of recording in response to the user operation when, for example, the moving image is reproduced, the favor level can be set to further satisfy the user's request.

3-5. Fifth Modification

In the embodiment described second, the CPU 11 is configured to set a single person attribute with respect to each predetermined time period of the moving image.

Alternatively, the CPU 11 may be configured to set a plurality of pieces of attribute information with respect to each predetermined time period of the moving image.

For example, the CPU 11 may be configured to set a "Baby A" attribute indicative of an expression of "Baby A" and a "Baby B" attribute indicative of the expression of "Baby B" with respect to each predetermined time period of the moving image when the user is taking a moving image of "Baby A" and "Baby B".

Figure 14:
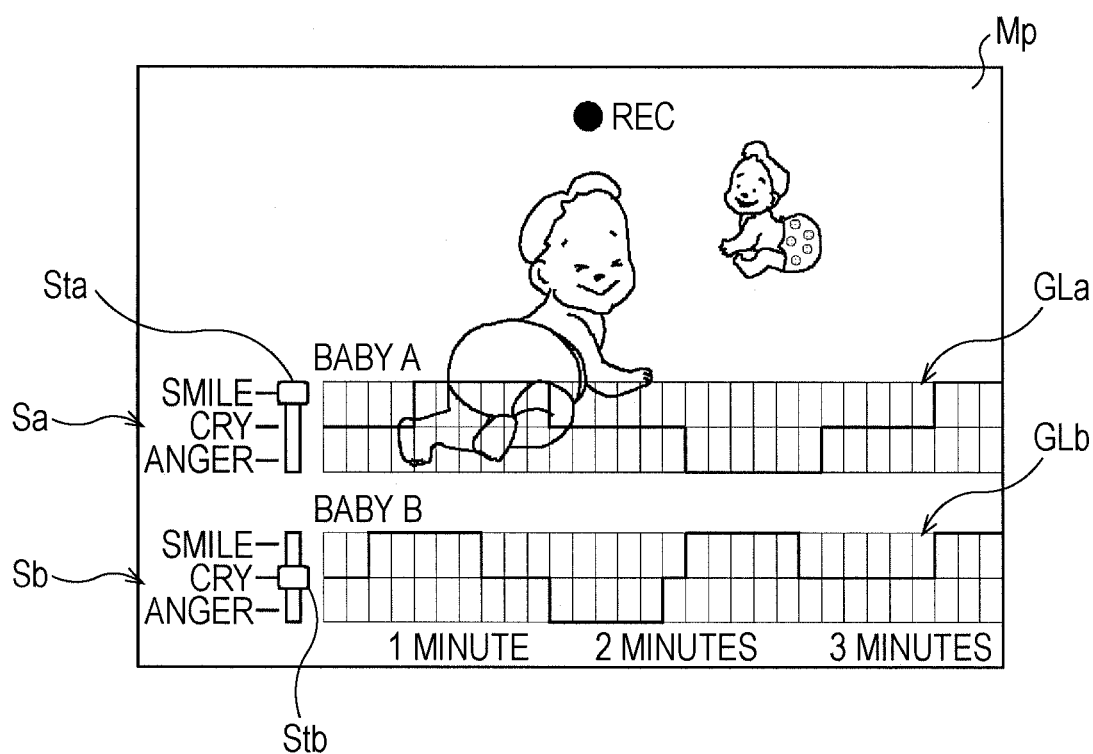
FIG. 14 is a schematic diagram for explaining a setting of attribute information according to a fifth modification.

In this case, when the CPU 11 starts recording the moving image, as shown in FIG. 14, the CPU 11 displays a slider bar Sa that allows the user to select the "Baby A" attribute and a slider bar Sb that allows the user to select the "Baby B" attribute superimposed on the monitoring image Mp.

The slider bars Sa and Sb are respectively provided with a slider Sta and a slider Stb capable of moving in the vertical directions in response to the user operation through the touch screen 14.

The slider bars Sa and Sb are configured to allow the user to specify the "Baby A" attribute or the "Baby B" attribute by moving the slider Sta or Stb through the touch screen 14. Specifically, the slider bars Sa and Sb are configured to specify any one of, for example, "smile", "cry", and "anger" in each of the "Baby A" attribute or the "Baby B" attribute.

It is assumed here that the CPU 11 sets sequentiality of "smile", "cry", and "anger" to be, for example, "smile">"cry">"anger". In this case, tick marks respectively indicative of "smile", "cry", and "anger" in the order from the top are displayed on each of the slider bars Sa and Sb.

"Smile" is specified by the user when, for example, "Baby A" or "Baby B" is smiling, "cry" is specified by the user when, for example, "Baby A" or "Baby B" is crying, and "anger" is specified by the user when, for example, "Baby A" or "Baby B" is angry.

The CPU 11 sets the "Baby A" attribute with respect to each predetermined time period of the moving image being recorded based on the location of the slider Sta on the slider bar Sa. The CPU 11 also sets the "Baby B" attribute with respect to each predetermined time period of the moving image being recorded based on the location of the slider Stb on the slider bar Sb.

The CPU 11 then generates "Baby A" attribute setting information and "Baby B" attribute setting information including the set "Baby A" attribute and the set "Baby B" attribute associated with the time period for which the person attributes are set, respectively, and stores the "Baby A" attribute setting information and the "Baby B" attribute setting information in the moving image management file in the storage unit 27.

The CPU 11 further displays transition of the "Baby A" attribute with respect to each predetermined time period on the right side of the slider bar Sa in the form of a graph GLa and transition of the "Baby B" attribute with respect to each predetermined time period on the right side of the slider bar Sb in the form of a graph GLb.

For example, when "Baby A" and "Baby B" are smiling in the monitoring image Mp, the "Baby A" attribute and the "Baby B" attribute are set to "smile".

As described above, by associating the "Baby A" attribute and the "Baby B" attribute with each predetermined time period of the moving image, the CPU 11 can reproduce the moving image based on the "Baby A" attribute and the "Baby B" attribute, at the time of reproducing the moving image.

For example, the CPU 11 can extract only the part where the "Baby A" attribute is set to "smile" and the "Baby B" attribute is also set to "smile" from the moving image and reproduce the extracted part of the moving image. As a result, the user can watch the part of the moving image in which both "Baby A" and "Baby B" are smiling.

As described above, by associating a plurality of pieces of attribute information with each predetermined time period of the moving image, at the time of reproducing the moving image, the CPU 11 can make the digital image signal processing unit 23 perform the reproduction of the moving image further satisfying various requests of the user.

3-6. Sixth Modification

In the embodiments described above, the CPU 11 is configured to store in the storage unit 27 the favor level or the person attribute specified by the user input associated with each predetermined time period of the moving image.

Alternatively, the CPU 11 may be configured to store in the storage unit 27 other various types of attribute information such as an excitation level associated with each predetermined time period of the moving image, as long as the attribute information includes a plurality of sequential pieces of the attribute information.

3-7. Seventh Modification

In the embodiment described first, the CPU 11 is configured to allow the user to specify the favorite reproduction threshold at the time of reproducing the moving image, extract the part where the favor level is set no lower than the favorite reproduction threshold from the moving image, and reproduce the extracted part of the moving image.

Alternatively, the CPU 11 may be configured to extract and reproduce, for example, a part of the moving image where the favor level is set no higher than the favorite reproduction threshold. Otherwise, the CPU 11 may be configured to allow the user to specify an arbitrary range of the favor level to be reproduced, extract the part where the favor level is set within the range from the moving image, and reproduced the extracted part of the moving image.

3-8. Eighth Modification

In the embodiment described first, the CPU 11 is configured to extract only the part where the favor level is set no lower than the favorite reproduction threshold specified by the user from the moving image and reproduce the extracted part of the moving image.

Alternatively, the CPU 11 may be configured to extract parts of the moving image before and after a time point at which the user recorded a still image while recording the moving image or a time point which includes a smiling face of a person detected by analyzing the moving image along with the part where the favor level is set no lower than the favorite reproduction threshold from the moving image and reproduce the extracted parts of the moving image.

In this case, the digital camera 10 includes a function of recording a still image by a user operation while recording a moving image and a function of analyzing the moving image by a predetermined analysis method such as a face recognition process for recognizing a person's face in the moving image and detecting a smiling face of the person.

3-9. Ninth Modification

In the embodiment described first, the CPU 11 is configured to extract only the part where the favor level is no lower than the favorite reproduction threshold specified by the user from the moving image and reproduce the extracted part of the moving image.

Alternatively, the CPU 11 may be configured to extract only parts where the favor level is no lower than the favorite reproduction threshold specified by the user from the moving image, generate a new moving image by putting the extracted parts of the moving image together, and store the new moving image in the storage unit 27 as a moving image file.

In this manner, the CPU 11 can edit the moving image only by letting the user specify the favorite reproduction threshold, and therefore the moving image can be edited more easily than when, for example, the moving image is edited by letting the user specify an IN point and an OUT point.

3-10. Tenth Modification

In the embodiments described above, the CPU 11 is configured to display the slider bar S2 or S4 at the time of reproducing the recorded moving image, and set the favorite reproduction threshold according to the location of the slider St2 or St4 on the slider bar S2 or S4.

Alternatively, the CPU 11 may be configured to set the favorite reproduction threshold by letting the user specify the favorite reproduction threshold before reproducing the recorded moving image.

In this manner, the CPU 11 does not display the slider bar S2 or S4 superimposed on the reproduction image Rp, and therefore the reproduction image Rp can be more eye-friendly to the user during the favorite reproduction.

3-11. Eleventh Modification

In the embodiment described first, the CPU 11 is configured to display the graph GL1 indicative of the transition of the favor level with respect to each predetermined time period superimposed on the monitoring image Mp at the time of recording the moving image.

Alternatively, the CPU 11 may be configured to hide the graph GL1 or display the graph GL1 only when desired by the user in response to the user operation. In this manner, the monitoring image Mp can be easily viewed without the graph GL1.

3-12. Twelfth Modification

In the embodiments described above, the CPU 11 is configured to set the attribute information such as the favor level and the person attribute with respect to each predetermined time period of the recorded moving image.

Alternatively, the CPU 11 may be configured to set the attribute information to other various types of the content as long as the content are stored in a recording medium.

For example, the CPU 11 may be configured to set the attribute information such as the person attribute with respect to each predetermined time period of various moving image contents such as a moving image recorded from a television broadcasting.

Furthermore, the CPU 11 may be configured to set the attribute information such as the favor level to each predetermined time period of the sound content such as music. In this case, the CPU 11 may be configured to allow the user to specify the attribute information such as the favor level with respect to each predetermined time period while outputting the sound content from the speaker 28.

3-13. Thirteenth Modification

In the embodiment described first, the computer program for executing the favor level setting procedure RT1 and the favorite reproduction procedure RT2 is stored in the ROM 12.

Alternatively, the computer program may be stored in a predetermined recording medium such as a memory card, and the CPU 11 may read the computer program from the recording medium and execute it. Otherwise, the CPU 11 may download the computer program from a predetermined server on the Internet and install it in the storage unit 27.

3-14. Fourteenth Modification

In the embodiments described above, the digital camera 10 is provided with the liquid crystal display 16 and the touch screen 14.

Alternatively, the digital camera 10 may be provided with a liquid crystal display including a touch screen function instead of the liquid crystal display 16 and the touch screen 14.

Furthermore, instead of the liquid crystal display 16, various types of displays such as an electroluminescence (EL) display may be used.

3-15. Fifteenth Modification

In the embodiments described above, the digital camera 10 that serves as the information processing device 1 is provided with the CPU 11 that serves as the control unit 2 and the reception unit 5, the liquid crystal display 16 that serves as the output unit 4 and the display unit 6, and the touch screen 14 that serves as the reception unit 5. The digital camera 10 is also provided with the digital image signal processing unit 23 that serves as the reproduction unit 7 as well as the lens unit 19 and the imaging device 21 that serve collectively as the imaging unit 8.

Alternatively, each of the above-described functional units may be replaced by other various types of hardware or software as long as it has a similar function.

Furthermore, in the embodiments described above, the digital image signal processing unit 23 of the digital camera 10 is configured to perform the reproduction based on the attribute information. Alternatively, the reproduction may be performed by an external reproduction device based on the attribute information stored in the storage unit 27.

Moreover, the embodiments of the present invention can be applied not only to the digital camera but also to other various information processing devices including a personal computer and a personal digital assistant (PDA) as long as the information processing device has a similar configuration.

3-16. Sixteenth Modification

The present invention is not limited to the embodiments described above and the first to fifteenth modifications explained above. The scope of the present invention also encompasses an arbitrary combination of, or an extraction of, part or all of the embodiments described above and the first to fifteenth modifications explained above. For example, the embodiment described second and the third modification may be combined.

The present application contains subject matter related to that disclosed in Japanese Priority Patent Application JP 2009-139447 filed in the Japan Patent Office on Jun. 10, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   circuitry configured to:
   set attribute information including discrete rating values in stepwise fashion based on a user input,
   wherein, the discrete rating values are rating, of content, set during recording of the content for each of a plurality of predetermined time periods of the content;
   control a display of the content and of the set attribute information for the plurality of predetermined time periods; and
   set a threshold rating value to control the display of the content, based on another user input, that includes the plurality of predetermined time periods of the content associated with the discrete rating values of the attribute information greater than the threshold rating value.

2. The information processing apparatus according to claim 1, wherein the display of the set attribute information comprises a graph indicating changes to the set attribute information across the plurality of predetermined time periods.

3. The information processing apparatus according to claim 2, wherein the circuitry is configured to set the attribute information based upon a touch operation received as the graph is displayed.

4. The information processing apparatus according to claim 1, wherein the set attribute information is selected from among the discrete rating values included in the attribute information.

5. The information processing apparatus according to claim 1, wherein the plurality of predetermined time periods of the content are contiguous time periods of the content, and the set attribute information spans the contiguous time periods of the content.

6. The information processing apparatus according to claim 1, wherein the circuitry is configured to set the attribute information after the content is recorded in a recording medium.

7. The information processing apparatus according to claim 6, further comprising the recording medium.

8. The information processing apparatus according to claim 1, wherein the circuitry is configured to set the attribute information during the display of the plurality of predetermined time periods of the content.

9. The information processing apparatus according to claim 1, wherein the circuitry is configured to control the display of each of the plurality of predetermined time periods of the content based at least in part on the attribute information set for each of the plurality of predetermined time periods of the content.

10. The information processing apparatus according to claim 1, wherein the circuitry is configured to control the display so that the plurality of predetermined time periods of the content having certain set attribute information are played back.

11. The information processing apparatus according to claim 1, wherein the content comprises a movie.

12. The information processing apparatus according to claim 1, wherein the circuitry is configured to control a display of an interface for setting the attribute information for the plurality of predetermined time periods of the content.

13. The information processing apparatus according to claim 12, wherein the interface is configured to enable a user to set the attribute information for the plurality of predetermined time periods of the content.

14. An information processing system, comprising:
a first circuitry configured to set attribute information including discrete rating values in stepwise fashion based on a user input,
  wherein the discrete rating values are ratings, of content, set during recording of the content for each of a plurality of predetermined time periods of the content;
a second circuitry configured to control a display of the content and of the set attribute information for the plurality of predetermined time periods; and
a third circuitry configured to set a threshold rating value to control the display of the content, based on another user input, that includes the plurality of predetermined time periods of the content associated with the discrete rating values of the attribute information greater than the threshold rating value.

15. An information processing method, comprising:
setting attribute information including discrete rating values in stepwise fashion based on a user input,
  wherein the discrete rating values are ratings, of content, set during recording of the content for each of a plurality of predetermined time periods of the content;
storing the set attribute information in at least one storage facility;
controlling a display of the content and of the set attribute information for the plurality of predetermined time periods; and
setting a threshold rating value to control the display of the content, based on another user input, that includes the plurality of predetermined time periods of the content associated with the discrete rating values of the attribute information greater than the threshold rating value.

16. At least one non-transitory computer-readable storage medium having instructions encoded thereon which, when executed in an information processing system, cause the information processing system to perform a method comprising:
setting attribute information including discrete rating values in stepwise fashion based on a user input,
  wherein the discrete rating values are ratings, of content, set during recording of the content for each of a plurality of predetermined time periods of the content;
controlling a display of the content and of the set attribute information for the plurality of predetermined time periods; and
setting a threshold rating value to control the display of the content, based on another user input, that includes the plurality of predetermined time periods of the content associated with the discrete rating values of the attribute information greater than the threshold rating value.

* * * * *